United States Patent [19]

Moeller et al.

[11] 4,422,111
[45] Dec. 20, 1983

[54] HIGH CAPACITY DATA CARTRIDGE SYSTEM AND PREFORMATTED CARTRIDGE FOR USE THEREIN

[75] Inventors: Gary D. Moeller, Maplewood; Robert E. Wolff, Edina, both of Minn.

[73] Assignee: Minnesota Mining and Manufacturing Company, St. Paul, Minn.

[21] Appl. No.: 294,435

[22] Filed: Aug. 20, 1981

Related U.S. Application Data

[63] Continuation of Ser. No. 72,229, Sep. 4, 1979, abandoned.

[51] Int. Cl.³ .................... G11B 5/09; G11B 15/18
[52] U.S. Cl. .................................. 360/72.1; 360/48; 360/72.2; 360/134
[58] Field of Search ................ 360/43, 48–51, 360/27, 69, 72.1, 72.2, 74.1, 74.4, 134, 63

[56] References Cited

U.S. PATENT DOCUMENTS

| | | | |
|---|---|---|---|
| 2,765,456 | 10/1956 | Hollander | 340/174 |
| 3,423,743 | 1/1969 | Silverman | 360/72.1 |
| 3,541,271 | 11/1970 | Joslow et al. | 360/72.1 |
| 3,587,180 | 6/1971 | Richt | 360/74.4 |
| 3,692,255 | 9/1972 | Von Behren | 242/192 |
| 3,736,581 | 5/1973 | Breikss | 360/43 |
| 3,911,487 | 10/1975 | Ladriere | 360/63 |
| 4,001,883 | 1/1977 | Strout | 360/48 |
| 4,081,844 | 3/1978 | Devore et al. | 360/48 |
| 4,180,838 | 12/1979 | Fehrenkamp | 360/63 |
| 4,200,893 | 4/1980 | Matison | 360/72.1 |
| 4,237,498 | 12/1980 | Van Eijck et al. | 360/72.2 |
| 4,321,632 | 3/1982 | Leis et al. | 360/49 |

Primary Examiner—Robert L. Richardson
Attorney, Agent, or Firm—Donald M. Sell; James A. Smith; William B. Barte

[57] ABSTRACT

A data cartridge recorder is disclosed in which a preformatted tape is employed to enable automatic detection of the beginning of the tape and the end of the tape as well as of the location of preidentifiable record locations positioned along a plurality of parallel tracks.

30 Claims, 6 Drawing Figures

FIG. 6

HIGH CAPACITY DATA CARTRIDGE SYSTEM AND PREFORMATTED CARTRIDGE FOR USE THEREIN

CROSS-REFERENCE TO RELATED APPLICATION

This application is a continuation of U.S. Ser. No. 72,229, filed Sept. 4, 1979 and now abandoned.

BACKGROUND OF THE INVENTION

1. Field of the Invention

This invention relates to magnetic tape recorders and preformatted tapes adapted for use therein, and in particular, to such recorders adapted for data recording purposes utilizing magnetic recording tapes preloaded in data cartridges.

2. Description of Prior Art

Data recording cartridges and recorders adapted for their use are notably disclosed and claimed in U.S. Pat. No. 3,692,225 (Von Behren). In the cartridge there disclosed a magnetic recording tape is preloaded in a reel-to-reel type enclosure together with an endless flexible belt in frictional contact with the tape on both reel hubs for incrementally bidirectionally driving the tape, including rapid accelerations and decelerations, such as are encountered in digital data recording and playback. While the system there set forth represents many advantages such that data cartridges are filling an important need in the computer industry, especially as backup storage for mini-computer and microprocessor based systems, heretofore they have not been able to offer sufficient capacity to backup fixed mounted rigid disk systems.

SUMMARY OF THE INVENTION

In contrast to the tape cartridge disclosed in the above-cited patent, the present invention is directed to a cartridge system, and to several specific portions thereof, by which a marked increase in storage capacity is achieved. Unlike the prior art cartridge recorders, the present invention is directed to a multitrack recorder in which a data cartridge having a preformatted tape therein, i.e., a tape prerecorded with particular code patterns, is utilized to effect subsequent control over data recording and playback operations.

One aspect of the present invention is, therefore, directed to a digital data cartridge comprising a housing and a magnetic recording tape movable along a transport path therein, in which the tape has prerecorded thereon a plurality of longitudinally-readable, different digital key patterns of equal length, each extending uniformly across the entire width of the tape and separated from each other by record locations of greater equal length, each key pattern uniquely identifying an adjacent record location.

In a further embodiment, the data cartridge contains the tape pre-loaded on two tape reels or spools, each end of the tape being wound about the hub of one of the spools. In such a case, the tape may also have recorded thereon a first unique pattern proximate one end of the tape and a second unique pattern proximate the other end of the tape, both of which additional patterns are similarly longitudinally-readable and extend uniformly across the entire width of the tape. In such an embodiment, the first pattern is indicative of and subsequently detectable and identifiable of the beginning of the tape, and the second pattern is indicative of and subsequently detectable and identifiable of the end of the tape.

Alternatively, the data cartridge of the present invention may also include a magnetic recording tape in which the prerecorded key patterns extend substantially across the entire width of the tape, each containing subpatterns symmetrically positioned about a center location to enable detection and unique identification of the adjacent record locations independently of the direction of tape movement.

In one embodiment, the first and second unique patterns are constructed so as to be detectable using relatively simple and inexpensive detector logic, as opposed to the more sophisticated logic circuits required to locate and decode the key patterns as well as the actual digital data itself. In such an embodiment, the first unique pattern comprises an extended length of tape having impressed thereon a pulse train having two components which alternate sequentially at a first predetermined spatial frequency, the first component being characterized by a unidirectional magnetic state, and the second being characterized by two subcomponents which alternate sequentially between oppositely directed magnetic states at a second spatial frequency which is different and higher than said first spatial frequency. Somewhat similarly, the second unique pattern comprises an extended length of tape having impressed thereon a continuous pulse train having two components which alternate between oppositely directed magnetic states at the second predetermined spatial frequency.

Another aspect of the present invention is directed to a system in which such a data cartridge and preformatted tape is employed. Such a system includes conventional means for positioning and driving a said tape along a transport path together with a magnetic recording and playback head positioned along the transport path and responsive to the magnetic patterns on the tape for generating electrical signals corresponding to the patterns.

Since the preformatted patterns extend uniformly over at least a portion of the width of the tape, preferably from one edge to the other, such patterns are desirably utilized to locate the record and playback head transversely with respect to the tape and to enable control over the subsequent transverse location thereof. In an embodiment encompassing such a feature, the system further comprises means for controllably incrementally positioning the head transversely to the transport path, and means responsive to the electrical signals produced by the head for enabling the head positioning means to incrementally move the head transversely to determine a head reference position corresponding to the edge of the patterns. Typically, as the patterns extend the full width of the tape, the reference position will thus correspond to the edge of the tape. The reference head position thus enables indexing subsequent incremental movement of the head to a selected one of a plurality of predetermined distances from the reference position, each of which distances initially defines and subsequently corresponds to one of a plurality of parallel tracks. In a particular embodiment, such a system includes a circuit for setting a threshold level of the signals and for detecting the point of the incremental movement at which the detected level of the signals falls below the threshold level, thereby establishing a zero position, i.e., the reference head position, from which subsequent incremental movement of the head may be indexed.

In a further embodiment, the system is adapted to respond to electrical signals corresponding to said either of the first or second unique patterns made up of the unidirectional and alternating magnetic states as described above for enabling the positioning and driving means to drive the tape along the transport path in a desired direction. In such an embodiment, the responsive means of the system includes means such as a trigger circuit coupled to the playback head for producing a gap indication pulse each time signals corresponding to components alternating at said second spatial frequency are not sensed within a given period of time. In order to ensure that the signals detected are derived from an extended length of tape, the responsive means further includes means such as a tachometer for generating a succession of pulses, the periodicity of which is indicative of the rate of tape motion.

Finally, processor means are also provided for acting on the respective signals. Such a processor desirably includes a first counter coupled to receive the pulses from the tachometer for counting a determined number of pulses and for providing an output pulse upon completion of the count as an indication of the passage of a given length of tape, and a second counter coupled to receive the gap indication pulse and the output pulse from the first counter, for counting the number of such gap indication pulses received prior to receipt of said output pulse. The processor thereby enables the absence of any counted gap indication pulses prior to the receipt of said output pulse to be recognized as corresponding to the second unique pattern, and a counted number of gap indication pulses in excess of a given value prior to the receipt of said output pulse to be recognized as corresponding to the first unique pattern.

DESCRIPTION OF THE PREFERRED EMBODIMENTS

As discussed above, the present invention is preferably directed to a recorder adapted for use with data recording cartridge of the type set forth in U.S. Pat. No. 3,692,255 (Von Behren). In the present invention, such a recorder enables a substantial increase in the storage density of such tape cartridges by making use of information which is pre-recorded on a blank cartridge at the time of manufacture. Such a preformat enables one to subsequently record data on the cartridge with no inter-record gap (IRG) in which the head must be stopped. Such a capability enables enhanced tape utilization. The preformat is independent of the number of tracks to be subsequently recorded. Further, the preformat enables the beginning of tape (BOT) and end of tape (EOT) to be sensed with the signals prerecorded on the tape, thereby eliminating the need for optical sensing techniques. Furthermore, the format enables the use of a redundant code for subsequent error detection and correction.

Figure 1:
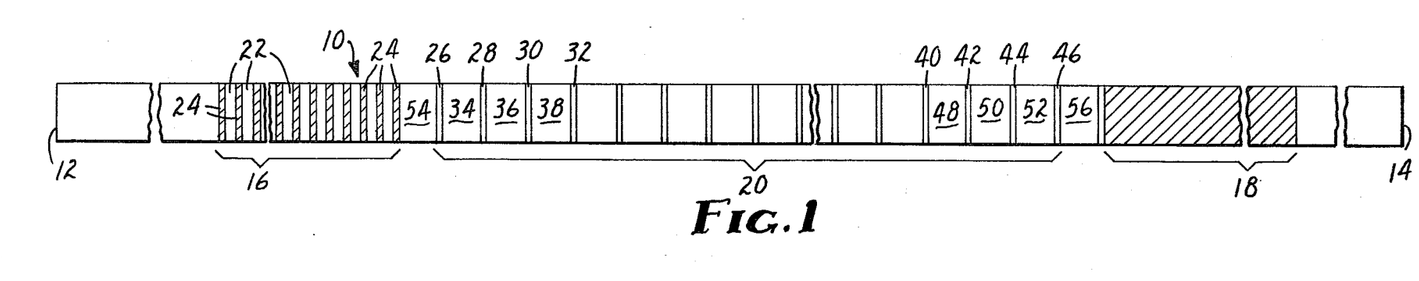
FIG. 1 is a view of the surface of a preformatted magnetic tape according to the present invention, with the magnetic patterns shown as though made visible through a magnetic viewing device.

A preferred embodiment of such a pre-recorded format is shown in FIG. 1. As there shown, a magnetic tape 10 extending from end 12 to end 14 would desirably be preloaded in a data cartridge (not shown) in the manner set forth in the above-referenced patent. Using an appropriately energized head having a gap which preferably extends across the entire width of the tape, the tape is then recorded with three sets of magnetic patterns such that the patterns similarly extend uniformly across the width of the tape. A first set of patterns 16 thus represents the beginning of tape BOT, a second set 18 represents the end of the tape EOT, and a third set 20, extending the majority of the length of the tape comprises a plurality of magnetic key patterns each of which is located at uniformly spaced locations along the tape. The first and second patterns 16 and 18 respectively, each comprise a separate and unique pattern which is subsequently detectable and identifiable as the beginning of tape and end of tape, respectively, and which are preferably so detectable at various tape velocities utilizing a relatively unsophisticated and inexpensive logic system. Accordingly, the BOT pattern 16 consists of a section of tape approximately 3 feet long onto which is recorded a succession alternating at a first spatial frequency of, for example 39 alternations per inch, in which the succession consists of unidirectionally magnetized areas 22, interspersed with areas 24 in which the magnetization is periodically reversed at a second and higher spatial frequency, such as at a rate of 5,000 flux reversals per inch. Such a pattern is readily provided at a recording tape speed of 30 inches per second by utilizing a succession of digital 1's and 0's, (i.e., 101010 . . . ) utilizing a conventional Modified Frequency Modulation (MFM) encoding system.

Similarly, the end of the tape pattern 18 is conveniently provided from the same succession of digital 1's and 0's, thereby providing a spatial frequency of 5,000 flux reversals per inch, but in which such a pattern is recorded continuously over approximately a three-foot long section near the end of the tape 14. The manner by which such BOT and EOT patterns 16 and 18 are unambiguously detected and distinguished from actual subsequently recorded digital data is discussed hereinafter in conjunction with FIG. 6.

As mentioned above, the third pattern 20 comprises a plurality of different digital magnetic key patterns 26, 28, 30 and 32 respectively, which follow the BOT pattern 16, and which are of equal length and are uniformly spaced. Between each of the key patterns are unrecorded record locations of greater equal length 34, 36, 38, etc. onto which digital data may subsequently be recorded. This succession of key patterns and record locations thus extends the entire length of the tape, culminating in a series of key patterns 40, 42, 44 and 46, respectively, between which are the final record locations 48, 50 and 52. Located between the end of the BOT pattern 16 and the first of the key patterns 26 is a portion of tape 54 which is dedicated for recording thereon drive test data. Similarly, following the final key pattern 46 and preceding the end of tape pattern 18 is a second region 56 which is also dedicated to having test drive data recorded thereon. Regions 54 and 56 are formatted similar to patterns 26, 28, etc and thus are indistinguishable from digital data.

As discussed above, the pre-recorded patterns 16, 18 and 20 desirably extend across the entire width of the tape 10 and thereby enable the detection of the BOT and EOT patterns 16 and 18, and key patterns 20 regardless of where a single track head may be positioned over the width of the tape. Similarly, the data locations between each of the key patterns 20 cause the record locations on each track to be positioned in columns extending transversely to the length of the tape.

In a preferred embodiment of the present invention, a 0.25 inch (6 mm) wide tape 10 is adapted to have recorded thereon 16 tracks of data, each track subsequent to the preceding one being recorded in an opposite direction onto the tape, resulting in a serpentine track pattern, each track extending over a 0.015 inch (0.375 mm) width. Thus, for example, during digital recording operations, when an end of tape pattern 18 is detected, the direction of travel of the tape 10 may be automatically reversed and a single track recording head transversely moved across the tape surface to a second transverse location onto which a second track may then be recorded in the opposite direction. When the BOT pattern 16 is subsequently sensed, the direction of the tape may again be reversed and the head advanced to a third track location and a third track recorded in the same direction as that of the first track as discussed here above.

Figure 2:
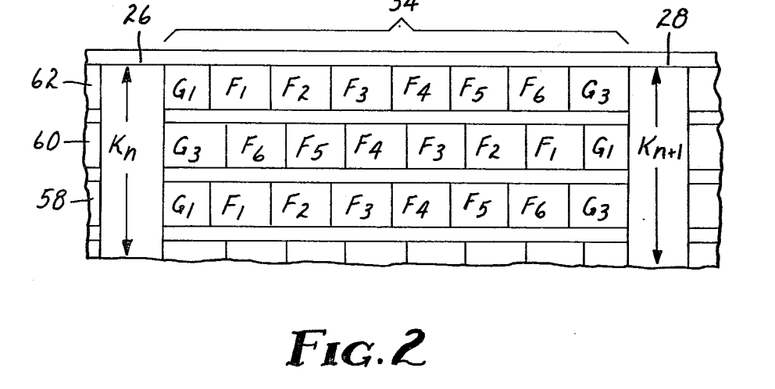
FIG. 2 is a similarly visible expanded view of a portion of the tape shown in FIG. 1, showing a portion of three parallel tracks.

FIG. 2 shows an expanded view of the manner in which three such tracks 58, 60 and 62, respectively, may be thus recorded. Each of the record locations, for example, location 34, is preceded by a key pattern 26 identified with that record location and is followed by second key pattern 28 which is identified with the next succeeding record location 36. The key patterns 26, 28, etc., extend across the width of the tape, so as to encompass all of the tracks subsequently recorded thereon. Tracks 58, 60 and 62 are recorded in the serpentine manner discussed above, such that each block of data, i.e., that within record location 34, begins with a key pattern which consists of a block of data 22 bytes in length, as will be described in more detail hereinafter. In this and subsequent examples, each block is formulated in bytes, each containing 8 digital bits. The next portion of the data block comprises an initial erase delay gap $G_1$. Following that gap, a succession of six frames $F_1$, $F_2$, $F_3$, $F_4$, $F_5$, and $F_6$, each 272 bytes long may be recorded. Following the last frame $F_6$, a final erase delay gap $G_3$ may be recorded, thus completing the data block within the record location 34. Once the direction of the tape is reversed, the track 60 may then be recorded in the opposite direction such that key pattern 28 $K_{n+1}$ becomes identified with the frames recorded within record location 34. Analogously to the data recorded in track 58, the data recorded in frame location 34 but within track 60, comprises, from right to left, an initial erase delay gap $G_1$, frames $F_1$ through $F_6$ and the final erase delay gap $G_3$. The data within track 62 is analogously recorded in the same direction as that in track 58.

Figure 3:
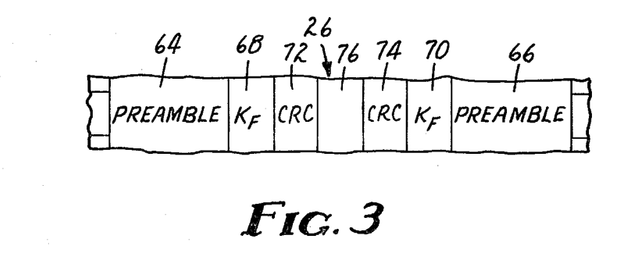
FIG. 3 is an expanded view of a portion of one of the tracks shown in FIG. 2, showing the details of a key pattern area along one of the tracks.

An expanded view of a typical prerecorded key pattern 26 is shown in FIG. 3. As may there be seen, each key pattern consists of an MFM encoded, symmetric pattern in which unit cells are recorded at 10,000 bits per inch. The pattern includes preambles 64 and 66, each of which consists of six bytes, forward keys 68 and 70, each of which are two bytes long, and cyclic redundancy check (CRC) code words 72 and 74, each of which are also two bytes long. All of the respective portions are symmetrically positioned about a two byte gap 76. Thus, for example, the 6 byte preamble may consist of a train of 47 digital 0's followed by a single digital 1, which thus enables synchronization at the beginning of each key pattern. The 2 byte keys 68 and 70 desirably consist of binary representations of numbers ranging between 0 and 65,536, and thus uniquely identify each of the record locations 34, 36, 38-48, 50 thru 52 shown in FIG. 1, each of the record locations being given a different binary number. Finally, the 2 byte CRC pattern 72 and 74 is generated in a conventional manner using the following serial calculation: $X^{16}+X^{15}+X^2+1$, operating on the data stream, excluding the preamble. The CRC is subsequently used in reading the data to detect the presence of errors.

Figure 4:
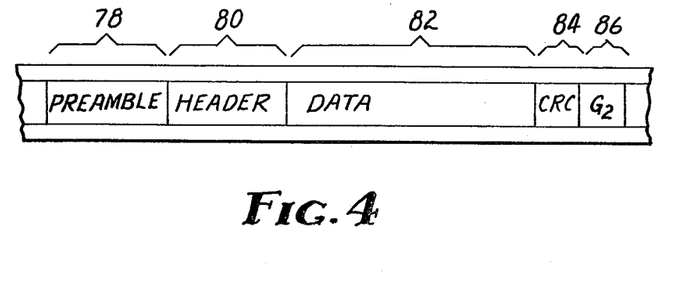
FIG. 4 is an expanded view of another portion of the pattern shown in FIG. 2 showing the details of the manner in which data within each frame is formatted.
Figure 5:
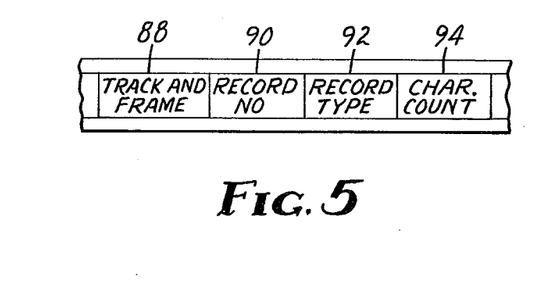
FIG. 5 is an expanded view of a portion of FIG. 4 showing the details in which header information within each frame is formatted.

As is further shown in detail in FIG. 4, each of the data frames $F_1$ through $F_6$ in each of the tracks 58 through 62 of the record locations 34, like that of the frames in all of the other record locations, consists of a 6 byte preamble 78, a 6 byte header 80, a 256 byte data portion 82, a 2 byte CRC code word 84, and a two byte inter frame gap $G_2$ 86. The 6 byte preamble 78 is like the preamble 64 in the key patterns 26, 28, etc. in that it comprises a succession of 47 digital zeros followed by a single 1 and is used for synchronization of a phase lock loop for accurate decoding of digital data during playback. Thus, during the playback of a given record location, synchronization is possible both during the playback of the key pattern and also at the beginning of each of the frames $F_1$ through $F_6$. The header portion 80, shown in more detail in FIG. 5, consists of a 1 byte track and frame number 88, a 2 byte record number 90, a 1 byte record type number 92, and a 2 byte character count 94. This information may be retrieved and used to uniquely identify the data recorded within each of the frames of a given record location. Digital data may be recorded in the data location 82 in a conventional manner, particularly as is set forth in U.S. Pat. No. 4,145,683 (Brookhart). As is there set forth, digital data is conveniently grouped into a block containing a succession of six frames. Data contained in certain frames is utilized to form parity words, and those words spatially recorded on portions of the tape which are sufficiently remote from the spatial locations of the data words from which those parity words are formed. Accordingly, a drop-out or other defect resulting in an erroneous signal during playback operations will not result in the loss of both the data and the parity words formed from that data. Corrected data words may thus subsequently be constructed from the spatially remote parity words. Unlike the format disclosed in the Brookhart patent referenced above, in the present invention, such parity information is desirably recorded in the frames 5 and 6 of each of the groups of data within a given record location. Thus, a parity word in a given frame $F_5$ is desirably formed from the logical EXCLUSIVE OR combination of the data in frames $F_1$ and $F_3$, while the parity word in frame $F_6$ is formed from the data words in Frames $F_2$ and $F_4$, respectively, Except for this manner of formatting the parity words and grouping them together at the end of a given record location, the process for forming the parity words, and correcting the data is the same as disclosed in the Brookhart patent referenced above, the disclosure which is incorporated herein by reference. The CRC code word 84 is formed in an identical fashion to that provided in the key pattern discussed in conjunction with FIG. 3.

Figure 6:
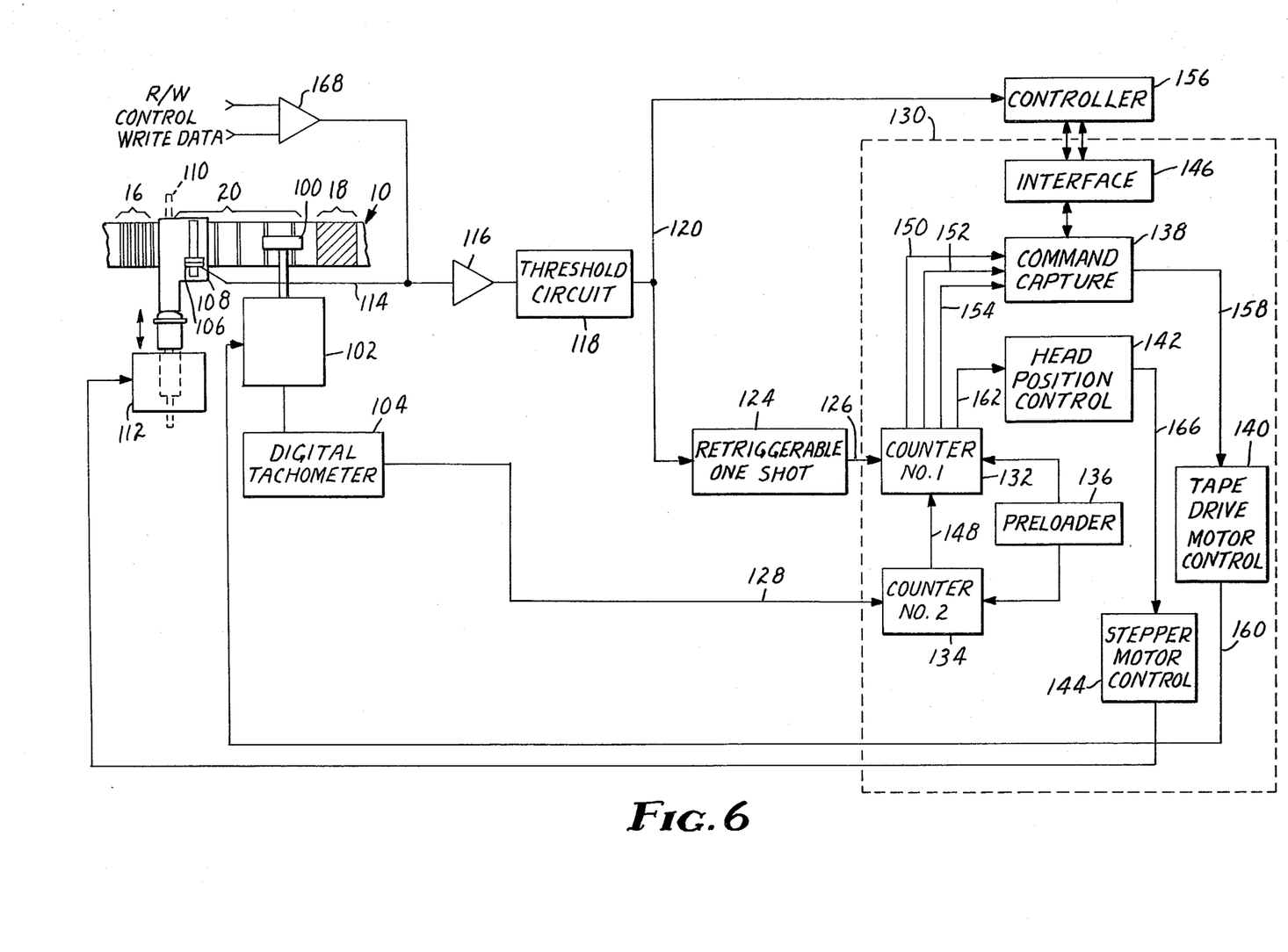
FIG. 6 is a combined pictorial and block diagram showing a system according to the present invention for utilizing the preformatted tape showing in FIGS. 1 through 5.

The manner by which the pre-recorded patterns are utilized to control recording operations during subsequent recording of digital data is best described in conjunction with FIG. 6. As may there be seen, the tape 10 within a data cartridge (not shown) is provided with the pre-recorded BOT patterns 16, EOT patterns 18 and key patterns 20, it being recognized that such patterns are shown symbolically and are not accurately representative of the actual spatial configuration or position of the respective patterns. Positioned along a transport path occupied by the tape is a motor driver 100 which is adapted to contact a drive roller within the tape cartridges as discussed in the U.S. Pat. No. 3,692,255 referenced above. The driver 100 is conventionally driven by a drive motor 102, the speed of which is monitored by a digital tachometer 104, all of which components are of conventional construction. Also positioned along the transport path is a record/playback head 106. The head 106 is adapted for tansverse motion across the width of the tape by means of a mount assembly 108 which is in turn movably supported on rod 110. The assembly 108 is coupled to a stepper motor 112, which when sequentially energized moves the assembly and the head in minute steps across the width of the tape.

The output from the record/playback head 106 is coupled by lead 114 to a preamplifier 116 which produces an amplified voltage level corresponding to that provided by the head 106. The output of the amplifier 116 is applied to a threshold detector circuit 118. Signals below a predetermined level, desirably approximately 20 percent of the normal output level, are thus ignored. Conversely, signals passing through the circuit 118 are coupled on output leads 120 to provide an output for the digital data and are also coupled to a retriggerable one-shot circuit 124. The circuit 124 has incorporated therein an RC circuit having a time constant which is long relative to the spacing between pulses resulting from the high frequency portion of the BOT pattern 16 or the continuous alterations in the EOT pattern 18 as shown in FIG. 1. Accordingly, so long as such high-frequency signals are present, the output of the one-shot circuit 124 will remain high. Conversely, the time constant within the circuit 124 is short relative to the duration of signals resulting from the unidirectional portion 22 of the BOT signal 16 as shown in FIG. 1 or gap portions with the record locations. Accordingly, upon the absence of such high-frequency signals, the retriggerable one-shot circuit "times out", and produces a pulse on output lead 126. A comparison of the number of such pulses on lead 126 as opposed to those provided by the digital tachometer 104 on leads 128 during a given time period thus enables the detection of the BOT and EOT patterns as distinct from digital data in the manner described hereinafter.

The processing of the pulses appearing on leads 126 and 128 are preferably done within a local microprocessor 130. As is shown in FIG. 6, the microprocessor 130 may be functionally viewed as containing a first counter 132, a second counter 134, a preloader 136, a command capture network 138, a tape drive motor control 140, a head position control 142, a stepper motor control 144, and an interface network 146.

The manner by which such functional equivalents are performed within the microprocessor 130 is as follows. Upon initiation of a given sequence of operations, the preloader 136 places a digital number into counters 132 and 134. As signal pulses are applied from the respective inputs on leads 126 and 128, they are subtracted from the preloaded number within each of the respective counters. An output on lead 148 from counter 134 is provided when the number of pulses provided from the tachometer 102 is equivalent to the passage of approximately 3 inches of tape, thereby enabling a sufficient redundancy to ensure the presence of either a BOT or an EOT signal pattern, as opposed to digital data within the respective record locations. This is achieved by preloading the counter 134 with a digital number such that when the number of pulses received on lead 128 equals the preloaded number, an output is produced which in turn stops the count within counter 132. At that time, the number within counter 132 is in and of itself indicative of the type of pattern detected. If the number remaining in counter 132 is still the same as that initially placed into the counter from the preloader 136, for example, a preload of the number 100, it is evident that no pulses on lead 126 have occurred thus indicating a continuous succession of high frequency signals, i.e., an end of tape signal such as reproduced from the pattern 18 as shown in FIG. 1. Conversely, if the number is negative, such that more pulses than the preloaded number of 100 have been subtracted, it is indicative of the presence of a large number of gap pulses such as produced by a succession of the unidirectional pulse regions 22, and is thus an indication of a BOT pattern is present. On the other hand, if the number within the counter is between zero and 100, an indication that normal digital data is present is provided. These three command indications are coupled on leads 150, 152, and 154 to the command capture network 138. As is shown, this network is coupled through interface network 146 to an external controller 156. Depending upon the instructions from the controller, the command capture network may then send appropriate signals on lead 158 to the tape drive motor control 140 and thence apply drive signals on leads 160 to drive the motor 102 in the appropriate direction, depending upon whether a BOT or EOT signal has been sensed. Similarly, upon sensing of either a BOT or EOT signal, a signal from counter 132 is coupled on lead 162 to the head position control 142. Again in response to instructions from controller 156 through the interface network 146, the head position control 142 provides an output signal on lead 166 to the stepper motor control 144, which in turn provides drive pulses to the stepper motor 112 and thereby steps the head 106 to an apropriate track location.

While the respective functions described above within the microprocessor 130 have been described in functional terms, it must be recognized that such functions are desirably performed by means of software instructions within a microprocessor as is now conventionally effected. In the preferred embodiment described herein, a microprocessor type MC 6803 manufactured by Motorola Semiconductor Corp. has been implemented.

The actual interpretation of data appearing on output lead 120 will also be coupled to the controller 156, within which is another microprocessor. It is thus the function of the controller processor to read the data at output 120 and to manage the interpretation of the format. However, the recognition of the key patterns identifying the beginning of each of the record locations must first be accomplished, prior to writing digital data within a given record location. Accordingly, the master controller 156 instructs the command capture network through interface 146 to initiate tape motion and transverse head motion so as to cause the head to traverse the appropriate track on the tape until the appropriate record location is detected. Once the appropriate key pattern is found, the controller allows the drive to run for a brief time, after which write current is coupled to the head 106 via amplifier 168. After a short delay needed for the gap within the head 106 to reach an area within the initial gap $G_1$, the writing of digital data within the record location actually begins. After completion of the writing of the data block, a constant current is applied to the head to obliterate all previously recorded data within that data block. The current is then turned off prior to the appearance of the next key pattern.

The pre-recorded patterns extending the width of the tape are further utilized during initial loading operations to determine the precise edge of the tape and thereby provide a reference position for the head 106 from which all subsequent track locations may be indexed. The manner by which such an operation is effected is as follows. When a cartridge is first inserted into the system, the controller 156 initiates a conditioning sequence during which the tape is repacked by running to the end of tape and back to the beginning of the tape. Upon detection of the beginning of tape signal, the head position control is then instructed to cause the stepper motor 112 to sequentially step the head toward one edge of the tape. This sequential stepping operation continues until the signal coupled to the threshold circuit 118 drops below a predetermined threshold level. The position of the head when the signal drops below the threshold level is then defined as the zero or reference position, and forms a reference point from which the head is subsequently instructed to be stepped so as to define future track locations. In an embodiment wherein the patterns extend substantially the width of the tape, it will be readily appreciated that all the patterns must terminate at a common line parallel to an edge of the tape such that the detected signal will similarly drop below the threshold level as the head is incrementally moved past the pattern termination line.

We claim:

1. A digital data cartridge comprising a housing and magnetic recording tape movable along a transport path therein, said tape having a plurality of prerecorded, longitudinally-readable, different digital key patterns of equal length, each extending uniformly across the entire width of the tape and separated from each other by record locations of greater equal length, each key pattern uniquely identifying an adjacent record location.

2. A digital data cartridge according to claim 1 adapted for use in a data cartridge drive unit having a record/playback head positionable transversely to the tape transport path, the edges of the key patterns being means detectable by said head for providing a reference head position from which the head may be controllably transversely positioned.

3. A digital data cartridge according to claim 1 adapted for use in a data cartridge drive unit having a record/playback head positionable transversely to the tape transport path to enable recording and reproduction of data from a plurality of parallel tracks along the tape, the edges of said key patterns being means detectable by said head for providing a reference head position from which the head may be controllably transversely positioned to a given one of said plurality of tracks.

4. A digital data cartridge according to claim 1, wherein said key patterns comprise portions on the leading and trailing edges thereof enabling synchronization at the beginning of each key pattern.

5. A digital data cartridge according to claim 1, further comprising two tape spools, each end of the tape being wound about the hub of one of the spools, said tape further
   (a) having prerecorded along an extended length proximate one end thereof and extending uniformly across the entire width thereof a first unique magnetic pattern which is readily detectable and identifiable as denoting one end of the tape, said first pattern comprising a succession of magnetized zones which alternate at a first predetermined spatial frequency between a first subpattern characterized by a unidirectional magnetic state and a second subpattern characterized by a succession of subzones between oppositely directed magnetic states at a second spatial frequency which is different from and higher than said first spatial frequency, and
   (b) having prerecorded along an extended length proximate the other end of the tape and extending uniformly across the entire width thereof a second unique pattern which is readily detectable and identifiable as denoting the other end of the tape, said second pattern comprising a succession of magnetized zones alternating between oppositely directed magnetic states at said second spatial frequency, whereby each respective end of the tape may be detected by the head and the direction of tape movement reversed in response thereto to enable recording and reproduction in both directions.

6. A data cartridge according to claim 5, wherein said first unique pattern comprises a succession of uniformly spaced regions alternating between two magnetic subpatterns at a first predetermined spatial frequency, which frequency is not greater than 100 cycles per inch, wherein the first subpattern is characterized by a unidirectional magnetic state and the second subpattern is characterized by a succession of subzones which alternate between oppositely directed magnetic states at a different and higher second predetermined spatial frequency corresponding to an alternating succession of digital ones and zeros, and wherein said second unique pattern comprises a continuous succession of magnetized zones alternating at said second predetermined frequency between oppositely directed magnetic states.

7. A data cartridge according to claim 1, wherein said key patterns correspond to a digital code adapted for identification of each of said record locations when the tape is moved in either direction, such that data may be subsequently recorded in one direction on some of the multiple tracks on the tape and in the opposite direction on the remaining tracks.

8. A data cartridge according to claim 7 wherein each of said key patterns contains subpatterns symmeterically positioned about a center location to enable detection of said subpatterns independent of the direction of tape movement.

9. A digital data cartridge comprising a housing and a magnetic recording tape movable along a transport path therein, said tape having a plurality of prerecorded, longitudinally-readable, different digital key patterns of equal length, each extending uniformly across substantially the entire width of the tape and separated from each other by record locations of greater equal length, each key pattern containing subpatterns symmetrically positioned about a center location to enable detection and unique identification of an adjacent record location independently of the direction of tape movement.

10. A digital data cartridge according to claim 9, wherein said key patterns extend uniformly across the entire width of the tape.

11. A digital data cartridge according to claim 10, adapted for use in a data cartridge drive unit having a record/playback head positionable transversely to the tape transport path to enable recording and reproduction of data from a plurality of parallel tracks along the tape, wherein the edges of said key patterns are detectable by the head to provide a reference head position from which the head may be controllably transversely positioned to a selected one of said plurality of tracks and each key pattern is longitudinally detectable to enable the tape to be controllably longitudinally positioned, whereby data may be recorded or reproduced from a selected record location defined by the selected track and key pattern.

12. A system for recording a predetermined format on a magnetic recording tape adapted for use in a data cartridge and drive unit therefor to enable control over the transverse position of a record/playback head within the drive unit and over the longitudinal movement of the tape within the cartridge to in turn control subsequent recording or reproduction of digital data at preestablished record locations within a selected track along the tape, said system comprising
 (a) means for positioning and driving the magnetic recording tape along a transport path,
 (b) means for positioning along said transport path a magnetic recording head having a recording gap exxtending substantially normal to the transport path and having a gap width extending uniformly across the width of the tape to enable recording magnetic patterns uniformly across the width of the tape, and
 (c) means for energizing said head for recording in said tape a plurality of longitudinally readable, different digital key patterns of equal length, and extending uniformly across the entire width of the tape and separated from each other by record locations of greater equal length.

13. A system according to claim 12, wherein said means for energizing further comprises means for recording in said tape a first unique magnetic pattern extending uniformly across the width thereof and proximate one end thereof for subsequently identifying that end, said first pattern comprising a succession of magnetized zones alternating at a first predetermined spatial frequency between a first subpattern characterized by a unidirectional magnetic state, and a second subpattern characterized by a succession of subzones between oppositely directed magnetic states at a second spatial frequency which is different from and higher than said first spatial frequency, and means for recording in said tape a second unique pattern extending uniformly across the width thereof and proximate the other end thereof for subsequently identifying that end, said second pattern comprising a succession of magnetized zones, which zones alternate between oppositely directed magnetic states at said second spatial frequency.

14. A system according to claim 13, wherein said means for energizing comprises
 (a) means for generating a first electrical pulse train having two components alternating at a first predetermined spatial frequency, the first component being characterized by a unidirectional electrical current, and the second being characterized by two subcomponents in which the electrical current alternates in opposite directions at a second predetermined spatial frequency which is different and higher than said first spatial frequency, and for outputting said first pulse train to said head for a predetermined duration in response to an indication that a portion of the tape proximate one end thereof is traversing the head to impress on that end portion as said first unique pattern a magnetic pattern corresponding to said first pulse train, and
 (b) means for generating a second electrical pulse train having two components in which the electrical current alternates tin opposite directions at said second predetermined spatial frequency, and for outputting to said head said second electrical pulse train for a predetermined duration in response to an indication that a portion of the tape proximate the other end thereof is traversing the head to impress on the other end portion as said second unique pattern a magnetic pattern corresponding to said second pulse train.

15. A system according to claim 13, wherein said means for energizing further comprises means for generating electrical signal patterns corresponding to a digital code adapted for identification of each of said record locations, each of said signal patterns containing subpatterns symmetrically positioned about a center location, whereby the patterns may be detected when the tape is moved in either direction and data subsequently recorded in one direction on some of the multiple tracks on the tape and in the opposite direction on the remaining tracks, and for outputting said signal patterns to said head at predetermined times as the tape is moved thereby to record upon the portion of the tape between said end portions said plurality of individually predetermined magnetic key patterns.

16. A method for recording a predetermined format on a magnetic recording tape adapted for use in a data cartridge and drive unit therefor to enable control over the transverse position of a record/playback head within the drive unit and over the longitudinal movement of the tape within the cartridge to in turn control subsequent recording or reproduction of digital data at preestablished record locations within a selected track along the tape, said method comprising the steps of:
 (a) positioning and driving the magnetic recording tape along a transport path,
 (b) positioning along said transport path a magnetic recording head having a recording gap extending substantially normal to the transport path and having a gap width extending uniformly across the width of the tape to enable recording magnetic patterns uniformly across the width of the tape, and
 (c) energizing said head for recording in said tape a plurality of longitudinally readable, different digital key patterns of equal length, each extending uniformly across the entire width of the tape and separated from each other by record locations of greater equal length.

17. A method according to claim 16, wherein said energizing step further comprises recording in said tape a first unique magnetic pattern extending uniformly across the width thereof and proximate one end thereof for subsequently identifying that end of the tape, said first pattern comprising a succession of magnetized zones alternating at a first predetermined spatial frequency between a first subpattern characterized by a unidirectional magnetic state, and a second subpattern characterized by a succession of subzones between oppositely directed magnetic states at a second spatial frequency which is different from and higher than said first spatial frequency, and recording in the tape a second unique pattern extending uniformly across the width thereof and proximate the other end thereof for subsequently identifying that end, said second pattern comprising a succession of magnetized zones, which zones alternate between oppositely directed magnetic states at said second spatial frequency.

18. A method according to claim 17, wherein said energizing step comprises
   (a) generating a first electrical pulse train having two components alternating at a first predetermined spatial frequency, the first component being characterized by a unidirectional electrical current, and the second being characterized by two subcomponents in which the electrical current alternates in opposite directions at a second predetermined spatial frequency which is different and higher than said first spatial frequency, and outputting said first pulse train to said head for a predetermined duration in response to an indication that a portion of the tape proximate one end thereof is traversing the head to impress on that end portion as said first unique pattern a magnetic pattern corresponding to said first pulse train, and
   (b) generating a second electrical pulse train having two components in which the electrical current alternates in opposite directions at said second predetermined spatial frequency, and outputting to said head said second electrical pulse train for a predetermined duration in response to an indication that a portion of the tape proximate the other end thereof is traversing the head to impress on the other end portion as said second unique pattern a magnetic pattern corresponding to said second pulse train.

19. A method according to claim 17, wherein said energizing step further comprises generating electrical signal patterns corresponding to a digital code adapted for identification of each of said record locations, each of said signal patterns containing subpatterns symmetrically positioned about a center location, whereby the patterns may be detected when the tape is moved in either direction and data subsequently recorded in one direction on some of the multiple tracks on the tape and in the opposite direction on the remaining tracks, and outputting said signal patterns to said head at predetermined times as the tape is moved thereby to record upon the portion of the tape between said end portions said plurality of individually predetermined magnetic key patterns.

20. A method for recording a predetermined format on a magnetic recording tape adapted for use in a data cartridge and drive unit therefor to enable control over the transverse position of a record/playback head within the drive unit and over the longitudinal movement of the tape within the cartridge to in turn control subsequent recording or reproduction of digital data at preestablished record locations within a selected track along the tape, said method comprising the steps of:
   (a) positioning and driving the magnetic recording tape along a transport path,
   (b) positioning along said transport path a magnetic recording head having a recording gap extending substantially normal to the transport path and having a gap width extending uniformly across substantially the width of the tape to enable recording magnetic patterns uniformly across substantially the entire width of the tape, and
   (c) energizing said head for recording in said tape a plurality of longitudinally readable, different digital key patterns of equal length, each extending uniformly across substantially the entire width of the tape and separated from each other by record locations of greater equal length, each key pattern containing subpatterns symmetrically positioned about a center location to enable detection and unique identification of an adjacent record location independent of the direction of tape movement.

21. A system for providing a preformatted tape adapted for subsequent recording of digital data at preestablished record locations along the tape, said system comprising:
   (a) means for positioning and driving a magnetic recording tape along a transport path,
   (b) a magnetic recording head positioned along said transport path and responsive to electrical signals for imparting magnetic patterns on the tape, said head including means for impressing said magnetic patterns uniformly across the width of the tape to enable subsequent control of the spatial location of data to be recorded on multiple tracks on the tape such that the record locations in each track are substantially at the same spatial position transverse to the tracks, and
   (c) means for energizing said head for providing in said tape
      (i) a first unique magnetic pattern proximate one end of the tape indicative of and subsequently detectable and identifiable of the beginning of the tape,
      (ii) a second unique pattern proximate the other end of the tape different from the first and indicative of and subsequently detectable and identifiable of the end of the tape, and
      (iii) uniformly spaced along the tape and between the first and second unique patterns, a plurality of individually predetermined magnetic key patterns, each of which is unique to a given one of a plurality of record locations,
wherein said energizing means further comprises means for generating said key patterns corresponding to a digital code adapted for identification of each of said record locations, each of said key patterns containing subpatterns symmetrically positioned about a center location to enable subsequent independent detection and identification of said subpatterns and thus of the beginning of a given one of said plurality of record locations when the tape is moved in either direction, so as to enable the control of the spatial location of data to be subsequently recorded in one direction at a given one of said record locations on some of the multiple tracks on the tape and in the opposite direction on the remaining tracks, the first and second unique patterns enabling automatic switching of the direction of tape movement and of the transverse positioning of the tape with respect to said head to alter the transverse location at which a subsequent track is to be recorded.

22. A system according to claim 21, wherein said energizing means further comprises
   (a) means for generating a first electrical pulse train having two components which alternate at a first predetermined spatial frequency, the first component being characterized by a unidirectional electrical current, and the second being characterized by two subcomponents in which the electrical current alternates in opposite directions at a second predetermined spatial frequency which is different and higher than said first spatial frequency, and
   (b) means for outputting said pulse train to said head for a predetermined duration in response to an indication that a portion of the tape proximate one end thereof is traversing the head to impress on that end portion as said first unique pattern a magnetic pattern corresponding to said first pulse train.

23. A system according to claim 22, wherein said energizing means further comprises
   (a) means for generating a second electrical pulse train having two components in which the electrical current alternates in opposite directions at said second predetermined spatial frequency, and
   (b) means for outputting said second electrical pulse train to said head for a predetermined duration in response to an indication that a portion of the tape proximate the other end thereof is traversing the head to impress on the other end portion as said second unique pattern a magnetic pattern corresponding to said second pulse train.

24. A system for controlling the transverse position of a magnetic recording/playback head relative to a magnetic recording tape movable along a transport path within a digital data cartridge to enable recording and playback from a selected one of a plurality of parallel tracks thereon, said tape having a plurality of prerecorded, longitudinally-readable patterns, each extending uniformly across substantially the entire width of the tape, terminating at a common line parallel to an edge of the tape, said system comprising
   (a) means for positioning and driving a said tape along said transport path,
   (b) magnetic record and playback head positioned along said transport path and responsive to said patterns for generating electrical signals corresponding thereto,
   (c) means for controllably incrementally positioning said head transversely with respect to said transport path beyond said common line, and
   (d) means responsive to said electrical signals for enabling said head positioning means to incrementally move the head transversely to determine a reference head position at said common line from which subsequent incremental movement of the head may be indexed to enable the head to be transversely positioned at a selected one of a plurality of predetermined distances from the reference position, each of which distances initially defines and subsequently corresponds to one of said plurality of tracks.

25. A system according to claim 24, wherein said patterns on the tape extend uniformly across the entire width of the tape, wherein said means for incrementally positioning said head comprises means for incrementally positioning said head beyond an edge of the tape, and wherein said enabling means includes means for causing said head to incrementally move transversely to determine said reference head position at an edge of the tape.

26. A system according to claim 24, wherein said patterns on the tape include a plurality of different digital key patterns of equal length separated from each other by record locations of greater equal length, each key pattern uniquely identifying an adjacent record location, further comprising means responsive to electrical signals corresponding to said key patterns and to said reference position for enabling said positioning and driving means to drive the tape to a record location adjacent a selected key pattern and also for enabling said head positioning means to position the head a selected distance from said reference position, whereby data may be recorded at or reproduced from the selected record location and the selected track defined by said distance.

27. A system according to claim 24, wherein said means responsive to electrical signals further comprises means for setting a threshold level of said signals and for detecting the point of said incremental movement at which the detected level of said signals falls below said threshold level, thereby establishing said reference head position.

28. A system according to claim 24, wherein said incremental head positioning means includes a stepper motor for transversely stepping the position of said head a distance equal to an integral multiple of a predetermined track-to-track spacing.

29. A system according to claim 24, wherein said tape is mounted within a digital data cartridge including two tape spools, each end of the tape being wound about the hub of one of the spools, said tape further having prerecorded along an extended length proximate one end thereof and extending uniformly across substantially the entire width thereof a first unique magnetic pattern which is readily detectable and identifiable as denoting one end of the tape, said first pattern comprising a succession of magnetized zones which alternate at a first predetermined spatial frequency between a first subpattern characterized by a unidirectional magnetic state and a second subpattern characterized by a succession of subzones between oppositely directed magnetic states at a second spatial frequency which is different from and higher than said first spatial frequency, and having prerecorded along an extended length proximate the other end of the tape and extending uniformly across substantially the entire width thereof a second unique pattern which is readily detectable and identifiable as denoting the other end of the tape, said second pattern comprising a succession of magnetized zones alternating between oppositely directed magnetic states at said second spatial frequency, said system further comprising means responsive to electrical signals produced by said head corresponding to said first or second unique pattern for enabling said positioning and driving means to reverse the direction of tape movement, thereby enabling recording and reproduction in both directions.

30. A system for controlling movement of a magnetic recording tape having a first unique magnetic pattern prerecorded uniformly across at least a portion of the width thereof and proximate one end thereof which is indicative of and subsequently detectable and identifiable of that end of the tape, said first unique pattern comprising an extended length of tape having impressed thereon a pulse train having two components alternating at a first predetermined spatial frequency, the first component being characterized by a unidirectional magnetic state, and the second component being characterized by two subcomponents which alternate between oppositely directed magnetic states at a second spatial frequency which is different and higher than said first spatial frequency and having a second unique pattern prerecorded uniformly across at least a portion of the width thereof and proximate the other end thereof which is indicative of and subsequently detectable and identifiable of said other end of the tape, said second unique pattern comprising an extended length of tape having impressed thereon a continuous pulse train having two components alternating between oppositely directed magnetic states at said second spatial frequency, said system comprising (a) means for positioning and driving a said tape along a transport path, (b) magnetic play back head positioned along said transport path and responsive to said magnetic patterns on the tape for generating electrical signals corresponding thereto, and (c) means responsive to electrical signals corresponding to said either of said first or second unique patterns, said responsive means including
  (i) means coupled to said playback head for producing a gap indication pulse each time signals corresponding to components alternating at said second spatial frequency are not sensed within a given period of time,
  (ii) tachometer means for generating a succession of pulses the periodicity of which is indicative of the rate of tape motion, and
  (iii) processor means including a first counter coupled to receive said pulses from said tachometer means for counting a determined number of said pulses and for providing an output pulse upon completion of said count as an indication of the passage of a given length of tape, and including a second counter coupled to receive said gap indication pulse and said output pulse from said first counter for counting the number of such gap indication pulses received prior to receipt of said output pulse, whereby the absence of any counted gap indication pulses prior to the receipt of said output pulse is recognizable as corresponding to said second unique pattern, and a counted number of gap indication pulses in excess of a given value prior to the receipt of said output pulse is recognizable as corresponding to said first unique pattern.

* * * * *